United States Patent [19]

Haide

[11] 3,888,082
[45] June 10, 1975

[54] HYDRODYNAMIC TORQUE CONVERTER

[75] Inventor: Karl Haide, Friedrichshafen, Germany

[73] Assignee: Motoren-und-Turbinen-Union Friedrichshafen GmbH, Germany

[22] Filed: Mar. 22, 1974

[21] Appl. No.: 453,808

[30] Foreign Application Priority Data

Mar. 23, 1973 Germany............................ 2314492

[52] U.S. Cl. ...................... 60/361; 60/364; 60/367
[51] Int. Cl. ............................................ F16h 41/00
[58] Field of Search .............. 60/361, 364, 365, 367

[56] References Cited
UNITED STATES PATENTS

| 3,105,396 | 10/1963 | Dundore et al. | 60/361 |
| 3,385,061 | 5/1968 | Lysholm | 60/361 |
| 3,797,243 | 3/1974 | Trusov | 60/361 |

Primary Examiner—Edgar W. Geoghegan
Attorney, Agent, or Firm—Craig & Antonelli

[57] ABSTRACT

A hydrodynamic torque converter for relatively large power outputs which includes a centrifugally transversed pump wheel and a centripetally traversed turbine wheel, both equipped with blades having a single curvature and flat and/or conical wheel side walls, a turbine wheel outlet diameter approximately equal to the inlet diameter of the pump wheel and a guide wheel arranged directly upstream of the pump wheel and a further guide wheel arranged directly downstream of the turbine wheel; the radial length of the turbine blading is larger than 15 percent of the middle diameter of the turbine blading while the blade spacing of the turbine wheel at the middle diameter of the turbine blading amounts to about 30 to 50 percent of the radial length of the turbine blades and the interior width of each blade flow channel at the outlet of the turbine wheel is smaller than 35 percent of the blade spacing.

31 Claims, 3 Drawing Figures

HYDRODYNAMIC TORQUE CONVERTER

The present invention relates to a hydrodynamic torque converter for relatively larger transferable outputs with a centrifugally traversed pump wheel, a centripetally traversed turbine wheel, both with blades having a single curvature and plane and/or conical wheel side walls, with a turbine wheel outlet diameter approximately equal to the pump wheel inlet diameter, and with a guide wheel arranged directly upstream of the pump wheel, as viewed in the flow direction, and with a further guide wheel arranged directly downstream of the turbine wheel, both preferably also with blades having a single curvature.

Such hydrodynamic torque converters are preferred in power transmissions, in which the torque transmission properties of the torque converter are necessitated only for certain periods of time, and in which during the remaining period of time the torque converter is to be by-passed by a mechanical clutch.

As a result of the described arrangement of the blade wheels, the fluid circulation in the flow channels of the blade wheels comes to a standstill with a by-passed torque converter, i.e., with the same rotational speeds of the pump and turbine wheel. The braking effect of the filled and by-passed torque converter is thereby far-reachingly avoided without having to empty the torque converter by means of costly filling and emptying devices involving a given required expenditure in time and without having to refill the torque converter again for the next torque converter operation. A slight braking action is accepted with the torque converters in question herein which have relatively higher transmission capacities of up to about 2,500 HP, in order to be able to dispense with the somewhat expensive measure, known with smaller torque converters, for the elimination of any braking action, namely to construct the guide wheels rotatable and to support the same by way of free-wheeling devices.

The use of blades having a single curvature enables a simple and accurate machining manufacture of the blades with a very good surface quality for favorable flow properties together with a sufficient mechanical rigidity and strength of the blades and blade wheels necessary for higher transmission capacities.

The aim of the present invention is to improve the properties of torque converters of the described type of construction.

The underlying problems are solved according to the present invention by the application of the following features:

a. The radial length of the turbine blading is larger than 15 percent of the middle diameter of the turbine blading;

b. The spacing of blades of the turbine wheel at the middle diameter of the turbine blading amounts to about 30 percent to about 50 percent of the radial length of the turbine wheel blades;

c. The interior width of each blade flow channel at the outlet of the turbine wheel is smaller than 35 percent of the blade spacing.

As compared to the prior art torque converters of this type of construction, an increase of the primary torque at rotational speed ratios between turbine wheel rotational speed to pump wheel rotational speed $n_T/n_P$ from zero to about 0.4, i.e., at small output rotational speeds is achieved by the present invention. Simultaneously therewith, an improvement of the ratio of secondary moment to primary moment is achieved in this range. Both improvements, which together produce particularly favorable starting characteristics of the torque converter, are additionally achieved with a smaller torque converter filling pressure. Additionally, the efficiency in the entire operating range, i.e., at rotational speed ratios between 0 and 1, above all between 0 and 0.7 is improved by the present invention.

Particularly favorable results are achieved if the blade spacing of the turbine wheel at the middle diameter of the turbine blading amounts to between 37 percent and 42 percent of the radial length of the turbine blade and if the interior width of each blade flow channel at the outlet of the turbine wheel amounts to between 22 percent and 30 percent of the blade spacing.

According to a further feature of the present invention, the interior width of the turbine blade flow channels at the middle diameter of the turbine blading amounts to about 40 to about 50 percent of the blade spacing. As a result thereof, with a favorable profiling of the blade flow channels, thick blade heads may be realized at the turbine blades for a low-loss entry of the flow into the turbine wheel over the entire rotational speed range.

A further improvement of the efficiency, particularly in the rotational speed ratio range between 0.4 and 1 results according to a further feature of the present invention in that the width of the blade flow channels of the turbine wheel at the middle diameter of the turbine blading or the constant width of the blade flow channels is equal or larger than 8 percent of the sum of the interior widths of the blade flow channels at the outlet of the turbine wheel, whereby particularly optimal values are attained if the width of the blade flow channels of the turbine wheel at the middle diameter of the turbine blading or the constant width of the blade flow channels is about 9 percent to about 15 percent of the sum of the interior widths of the blade flow channels at the outlet of the turbine wheel.

In order to achieve the regulating ability of the input power of the torque converter desired or necessary for different applications, according to a still further feature of the present invention, the guide wheel arranged directly upstream of the pump wheel, as viewed in the flow direction, is equipped with blades pivotal during operation.

Accordingly, it is an object of the present invention to provide a hydrodynamic torque converter, particularly a hydrodynamic torque converter capable of transmitting large power outputs, which avoids by simple means the aforementioned shortcomings and drawbacks encountered in the prior art.

Another object of the present invention resides in a hydrodynamic torque converter which enables the realization of an increase of the primary torque at low output rotational speed as well as an improvement of the ratio of secondary torque to primary torque.

A still further object of the present invention resides in a hydrodynamic torque converter which is characterized by particularly favorable starting characteristics of the torque converter, attainable even with low filling pressures of the torque converter.

Still another object of the present invention resides in a hydrodynamic torque converter in which the efficiency is improved over the entire operating range.

A further object of the present invention resides in a hydrodynamic torque converter which permits relatively simple and inexpensive manufacture combined with the possibility for favorable design of the blade flow channels.

Still a further object of the present invention resides in a hydrodynamic torque converter of the type described above in which an entry of the flow into the turbine wheel exhibiting relatively low flow losses, is made possible over the entire rotational speed range without sacrifice in the strength of the blades themselves.

These and other objects, features and advantages of the present invention will become more apparent from the following description when taken in connection with the accompanying drawing which shows, for purposes of illustration only, one embodiment in accordance with the present invention, and wherein.

Figure 1:
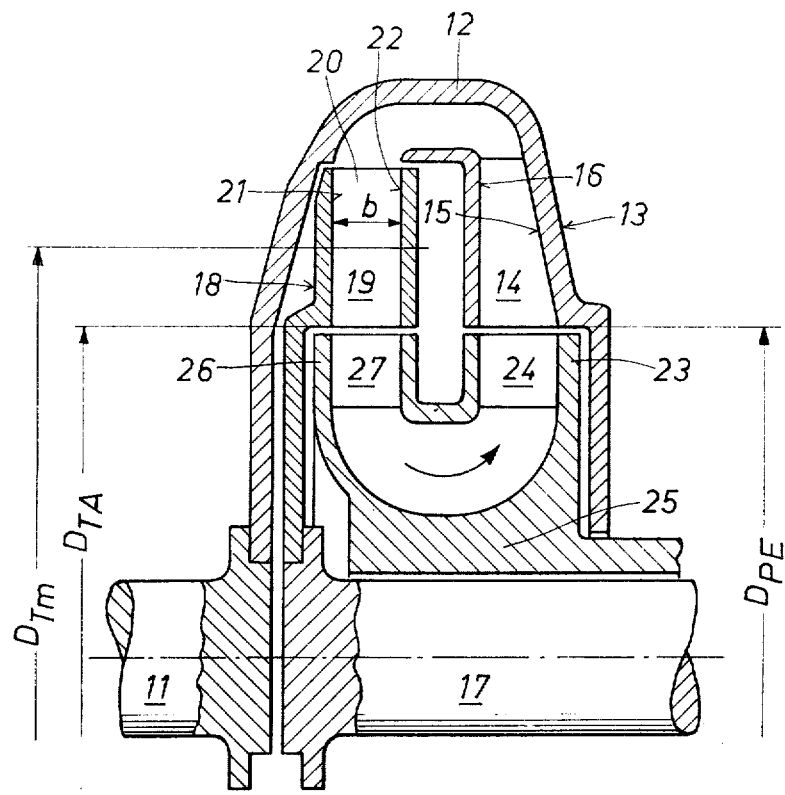
FIG. 1 is a partial longitudinal cross-sectional view through a torque converter in accordance with the present invention.

Referring now to the drawing wherein like reference numerals are used throughout the two views to designate like parts, the torque converter illustrated in longitudinal cross section in FIG. 1 includes a rotating torque converter housing 12 rigidly connected with a drive shaft 11. A torque converter pump wheel generally designated by reference numeral 13 and having pump wheel blades 14 with a simple or single curvature is connected with the torque converter housing 12. The pump wheel blades 14 and the flow channels formed thereby within the pump wheel 13 are delimited externally by a conical side wall 15 and internally by a plane side wall 16. A turbine wheel 18 connected with an output shaft 17 and having turbine wheel blades 19 also with a single curvature is arranged on the side of the torque converter opposite the pump wheel. The turbine wheel blades 19 and therewith also the blade flow channels 20 within the turbine wheel are delimited externally and internally by plane side walls 21 and 22. As with the pump wheel, also with the turbine wheel the outer side wall may be constructed conically or in each case both side walls of the pump wheel as also of the turbine wheel may be constructed conically.

The outlet diameter $D_{T4}$ of the turbine wheel is approximately equal to the inlet diameter $D_{PE}$ of the pump wheel.

A guide wheel 23 having guide blades 24 is connected with a stationary guide wheel carrier or support 25 and is arranged directly upstream of the pump wheel 13, as viewed in the flow direction indicated by an arrow. A further guide wheel 26 having guide blades 27 is also rigidly connected with the stationary guide wheel carrier 25 and is arranged directly downstream of the turbine wheel 18 as viewed in the flow direction. The guide blades 24 and 27 preferably also have a single curvature only.

For certain applications of the torque converter where a regulatability of the torque converter input power is desirable or necessary, the guide wheel blades 24 of the guide wheel 23 may be constructed so as to be pivotal. An installation suitable therefor which is actuatable from the outside is generally known in the prior art and therefore not described and illustrated in FIG. 1 for the sake of simplicity.

Figure 2:
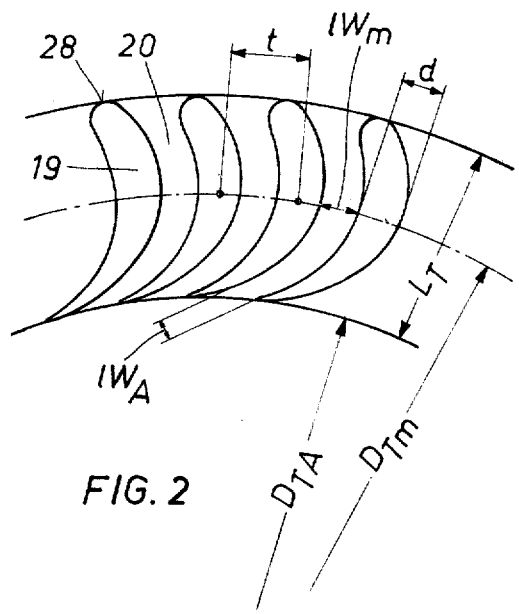
FIG. 2 is a somewhat schematic cross-sectional view through the turbine blading perpendicular to the torque converter axis.

In FIG. 2 which illustrates in cross section, a section of the turbine blading with some turbine blades 19 and with the blade flow channels 20, the radial length of the turbine blades is designated by reference character $L_T$, the middle diameter of the turbine blading by reference character $D_{Tm}$ and the blade spacing by reference character $t$. Reference character $IW_A$ is the interior width of a blade flow channel 20 at the turbine wheel outlet whereas reference character $IW_M$ is the interior width of a blade flow channel 20 at the middle diameter $D_{Tm}$ of the turbine blading and reference character $d$ the blade thickness at the middle diameter $D_{Tm}$ of the turbine blading.

The measures of the present invention which produce a considerable improvement of the properties of the described torque converter construction, consist primarily of the special construction of the blading of the turbine wheel illustrated in FIG. 2.

According to the present invention, the radial length $L_T$ of the turbine blading amounts at least to about 15 percent of the middle diameter $D_{Tm}$ of the turbine blading while the blade spacing $t$ of the turbine wheel 18 amounts to between about 30 percent and about 50 percent of the radial length $L_T$ of the turbine blades 19 and the interior width $IW_A$ of each blade flow channel 20 at the outlet of the turbine wheel 18 is smaller than about 35 percent of the blade spacing $t$.

Relatively long and narrow nozzle-shaped blade flow channels result therefrom, in which the flow is well guided and the flow losses are kept relatively small as a result of the acceleration of the flow.

Preferred constructions with particularly favorable properties are obtained if the blade spacing $t$ of the turbine wheel 18 at the middle diameter amounts to between about 37 percent and about 42 percent of the radial length $L_T$ of the turbine blades 19, and if the interior width $IW_A$ of each blade flow channel 20 at the outlet of the turbine wheel 18 amounts to between about 22 percent and about 30 percent of the blade spacing $t$.

The measures proposed according to a further feature of the present invention, according to which ($IW_M$ of the turbine blade flow channels 20 amounts to about 40 percent to about 50 percent of the blade spacing, enables under preservation of a favorable form of the blade flow channels 20, a sufficiently thick construction and suited rounding off of the turbine blade heads 28 in order to keep small the shock losses in the fluid flowing in different directions toward the turbine wheel 18 depending on the rotational speed ratio $n_T/n_P$.

An efficient, further construction of the present invention resides in that the width $b$ (FIG. 1) of the blade flow channels 20 of the turbine wheel 18 or the middle width $b$ at the middle blade diameter $D_{Tm}$ in turbine wheels with one or two conical side walls is equal to or larger than 8 percent, preferably between about 9 percent and about 15 percent, than the sum of the interior widths $IW_A$ at the outlet of the turbine wheel 18. This measure brings about that the blade flow channels 20 which are intentionally formed nozzle-shaped in the interest of a flow which is as loss-free as possible, do not unnecessarily throttle the fluid stream circulating in the torque converter.

Figure 3:
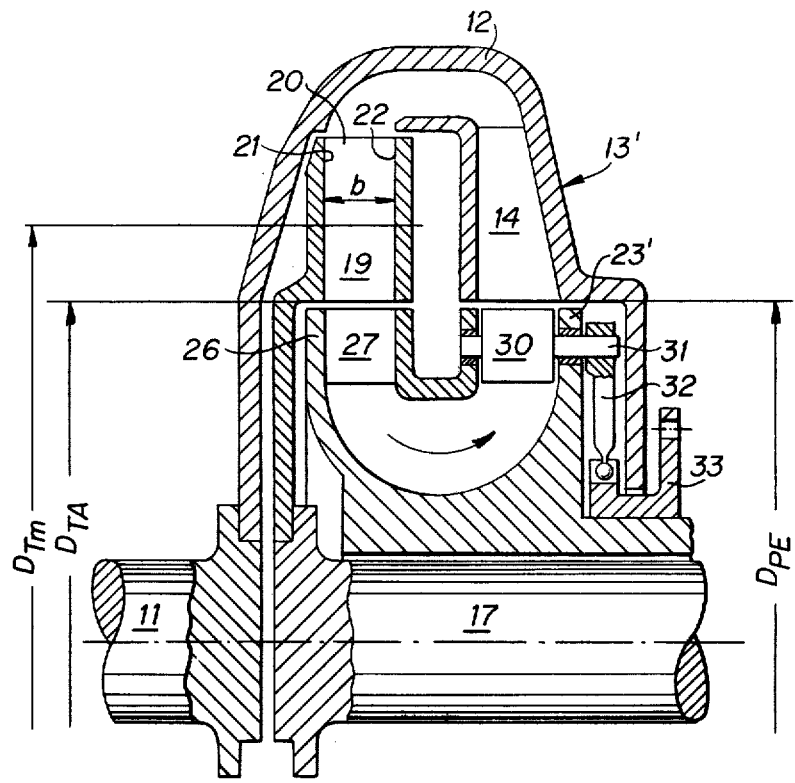
FIG. 3 is a partial longitudinal cross-sectional view through a further torque converter in accordance with the present invention.

The regulatability of the input power of the torque converter is achieved according to the constructional features of the present invention illustrated in FIG. 3. As illustrated in FIG. 3, adjustable guide blades 30 are disposed on a blade shaft 31 pivotally mounted in a guide wheel 23' arranged upstream of a pump wheel 13'. Suitable adjusting means such as an adjusting lever 31 and an adjusting ring 33 may be provided for simultaneously adjusting all of the guide blades 30. The constructional arrangement of FIG. 3, is desirable, for example, in case of use of the torque converter together with a supercharged Diesel engine as a drive for heavy land vehicles. By reason of the special characteristics of supercharged Diesel engines, it is advantageous, for example, during the starting of the vehicle, for a rapid acceleration of the engine rotational speed from the idling rotational speed to the rated rotational speed if the input power of the torque converter is reduced for that purpose. The engine thereby reaches very rapidly its rated rotational speed and therewith its rated output so that together with the torque converter then readjusted simultaneously to its full input power, it enables together with favorable starting properties a high starting traction and a high starting acceleration of the vehicle.

While I have shown and described two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A hydrodynamic torque converter including a pump wheel means centrifugally traversed and a turbine wheel means centripetally traversed, both the pump and turbine wheel means having blade means and wheel side walls, the turbine wheel outlet diameter being approximately equal to the pump wheel inlet diameter, and first guide wheel means arranged substantially directly upstream of the pump wheel means as viewed in the flow direction and a further guide wheel means arranged substantially directly downstream of the turbine wheel means, characterized in that
   a. the radial lenght ($L_T$) of the turbine blade means is larger than about 15 percent of the middle diameter ($D_{TM}$) of the turbine blade means;
   b. the blade spacing of the turbine wheel means at the middle diameter thereof amounts to about 30 percent to about 50 percent of the radial length of the turbine wheel blade means, and
   c. the interior width ($IW_A$) of each blade flow channel at the outlet of the turbine wheel means being smaller than about 35 percent of the blade spacing of the turbine wheel means.

2. A hydrodynamic torque converter according to claim 1, characterized in that the blade means of the pump wheel means and of the turbine wheel means have a single curvature.

3. A hydrodynamic torque converter according to claim 2, characterized in that the blade means of both guide wheel means have single curvature.

4. A hydrodynamic torque converter according to claim 3, characterized in that at least some of the side walls are plane.

5. A hydrodynamic torque converter according to claim 3, characterized in that at least some of the wheel side walls are conical.

6. A hydrodynamic torque converter according to claim 1, characterized in that the blade spacing of the turbine wheel means amounts at the middle diameter of the turbine blade means between about 37 percent and about 42 percent of the radial length of the turbine blade means.

7. A hydrodynamic torque converter according to claim 6, characterized in that the interior width of each blade flow channel amounts at the outlet of the turbine wheel means to about between 22 percent and about 30 percent of the blade spacing of the turbine wheel means.

8. A hydrodynamic torque converter according to claim 7, characterized in that the interior width ($IW_m$) of the turbine blade flow channels at the middle diameter of the turbine blade means amounts to about 40 percent to about 50 percent of the turbine blade spacing.

9. A hydrodynamic torque converter according to claim 8, characterized in that the width (b) of the blade flow channels of the turbine wheel means at the middle diameter of the turbine blade means is at least substantially equal to 8 percent of the sum of the interior widths of the blade flow channels at the outlet of the turbine wheel means.

10. A hydrodynamic torque converter according to claim 9, characterized in that the width of the blade flow channels of the turbine wheel means at the middle diameter of the turbine blade means is larger than 8 percent of the sum of the interior widths of the blade flow channels at the outlet of the turbine wheel means.

11. A hydrodynamic torque converter according to claim 8, characterized in that the substantially constant width of the blade flow channels is at least equal to 8 percent of the sum of the interior widths of the blade flow channels at the outlet of the turbine wheel means.

12. A hydrodynamic torque converter according to claim 11, characterized in that the substantially constant width of the blade flow channels is larger than 8 percent of the sum of the interior widths of the blade flow channels at the outlet of the turbine wheel means.

13. A hydrodynamic torque converter according to claim 9, characterized in that the width of the blade flow channels of the turbine wheel means at the middle diameter of the turbine blade means is about between 9 percent to about 15 percent of the sum of the interior widths of the blade flow channels at the outlet of the turbine wheel means.

14. A hydrodynamic torque converter according to claim 11, characterized in that the substantially constant width of the blade flow channels is about 9 percent to about 15 percent of the sum of the interior widths of the blade flow channels at the outlet of the turbine wheel means.

15. A hydrodynamic torque converter according to claim 8, characterized in that the first guide wheel means arranged directly upstream of the pump wheel means includes blade means pivotal in operation.

16. A hydrodynamic torque converter according to claim 15, characterized in that the width (b) of the blade flow channels of the turbine wheel means at the middle diameter of the turbine blade means is at least substantially equal to 8 percent of the sum of the interior widths of the blade flow channels at the outlet of the turbine wheel means.

17. A hydrodynamic torque converter according to claim 16, characterized in that the width of the blade flow channels of the turbine wheel means at the middle diameter of the turbine blade means is larger than 8 percent of the sum of the interior widths of the blade flow channels at the outlet of the turbine wheel means.

18. A hydrodynamic torque converter according to claim 15, characterized in that the width of the blade flow channels of the turbine wheel means at the middle diameter of the turbine blade means is about between 9 percent to about 15 percent of the sum of the interior widths of the blade flow channels at the outlet of the turbine wheel means.

19. A hydrodynamic torque converter according to claim 15, characterized in that the substantially constant width of the blade flow channels is at least equal to 8 percent of the sum of the interior widths of the blade flow channels at the outlet of the turbine wheel means.

20. A hydrodynamic torque converter according to claim 19, characterized in that the substantially constant width of the blade flow channels is larger than 8 percent of the sum of the interior widths of the blade flow channels at the outlet of the turbine wheel means.

21. A hydrodynamic torque converter according to claim 15, characterized in that the substantially constant width of the blade flow channels is about 9 percent to about 15 percent of the sum of the interior widths of the blade flow channels at the outlet of the turbine wheel means.

22. A hydrodynamic torque converter according to claim 6, characterized in that the blade means of the pump wheel means and of the turbine wheel means have a single curvature.

23. A hydrodynamic torque converter according to claim 1, characterized in that the interior width of each blade flow channel amounts at the outlet of the turbine wheel means to about between 22 percent and about 30 percent of the turbine blade spacing.

24. A hydrodynamic torque converter according to claim 23, characterized in that the interior width ($IW_m$) of the turbine blade flow channels at the middle diameter of the turbine blade means amounts to about 40 percent to about 50 percent of the turbine blade spacing.

25. A hydrodynamic torque converter according to claim 1, characterized in that the width (b) of the blade flow channels of the turbine wheel means at the middle diameter of the turbine blade means is at least substantially equal to 8 percent of the sum of the interior widths of the blade flow channels at the outlet of the turbine wheel means.

26. A hydrodynamic torque converter according to claim 25, characterized in that the width of the blade flow channels of the turbine wheel means at the middle diameter of the turbine blade means is larger than 8 percent of the sum of the interior widths of the blade flow channels at the outlet of the turbine wheel means.

27. A hydrodynamic torque converter according to claim 1, characterized in that the substantially constant width of the blade flow channels is at least equal to 8 percent of the sum of the interior widths of the blade flow channels at the outlet of the turbine wheel means.

28. A hydrodynamic torque converter according to claim 27, characterized in that the substantially constant width of the blade flow channels is larger than 8 percent of the sum of the interior widths of the blade flow channels at the outlet of the turbine wheel means.

29. A hydrodynamic torque converter according to claim 1, characterized in that the width of the blade flow channels of the turbine wheel means at the middle diameter of the turbine blade means is about between 9 percent to about 15 percent of the sum of the interior widths of the blade flow channels at the outlet of the turbine wheel means.

30. A hydrodynamic torque converter according to claim 1, characterized in that the substantially constant width of the blade flow channels is about 9 percent to about 15 percent of the sum of the interior widths of the blade flow channels at the outlet of the turbine wheel means.

31. A hydrodynamic torque converter according to claim 1, characterized in that the first guide wheel means arranged directly upstream of the pump wheel means includes blade means pivotal in operation.

* * * * *